United States Patent
Esterberg et al.

(10) Patent No.: US 6,718,408 B2
(45) Date of Patent: Apr. 6, 2004

(54) INTERCHANGEABLE AND CONFIGURABLE INPUT/OUTPUT MODULE FOR A COMPUTING DEVICECO

(75) Inventors: Dennis R Esterberg, Philomath, OR (US); James P Dickie, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 356 days.

(21) Appl. No.: 09/765,840

(22) Filed: Jan. 18, 2001

(65) Prior Publication Data

US 2002/0095533 A1 Jul. 18, 2002

(51) Int. Cl.[7] .............................. G06F 1/16; H05K 7/10
(52) U.S. Cl. .............................. 710/62; 710/8; 710/10; 710/16; 710/38; 710/63; 710/100; 361/600; 361/653; 361/683; 361/684; 361/686
(58) Field of Search ................................ 710/8, 10, 16, 710/38, 62, 63, 100; 361/600, 653, 684, 686

(56) References Cited

U.S. PATENT DOCUMENTS

| | | | |
|---|---|---|---|
| 5,469,545 A | * 11/1995 | Vanbuskirk et al. | 709/234 |
| 5,569,052 A | * 10/1996 | Belt et al. | 439/638 |
| 5,805,412 A | * 9/1998 | Yanagisawa et al. | 361/686 |
| 5,832,073 A | 11/1998 | Hannigan et al. | 379/325 |
| 5,982,614 A | * 11/1999 | Reid | 361/686 |
| 6,018,456 A | * 1/2000 | Young et al. | 361/684 |
| 6,188,573 B1 | * 2/2001 | Urita | 361/687 |
| 6,231,371 B1 | * 5/2001 | Helot | 439/374 |
| 6,407,914 B1 | * 6/2002 | Helot | 361/686 |
| 6,628,517 B1 | * 9/2003 | Helot et al. | 361/686 |

FOREIGN PATENT DOCUMENTS

WO   WO 97/49025   12/1997   ............. G06F/1/18

OTHER PUBLICATIONS

"Customer–Installable Attachment Module" IBM Technical Disclosure Bulletin, vol. 33, No. 4, Sep. 1990, IBM Corporation, pp. 38–39.

D1: "Customer–Installable Attachment Module": IBM Technical Disclosure Bulletin, IBM Corp. New York, US, vol. 33, No. 4, Sep. 1, 1990, pp. 38–39, XP000124469 ISSN: 0018–8689.

* cited by examiner

*Primary Examiner*—Jeffrey Gaffin
*Assistant Examiner*—Tammara Peyton (57) ABSTRACT

An input/output module for a computer having one, or multiple, input/output connectors that interface external devices with components in a computer. The input/output module is removable from the computer and interchangeable with a different input/output module having a different input/output connector than the first input/output module. The input/output module passes unmodified signals, and/or processes signals and passes modified signals, between the external devices and the computer components.

58 Claims, 8 Drawing Sheets

Fig. 10

INTERCHANGEABLE AND CONFIGURABLE INPUT/OUTPUT MODULE FOR A COMPUTING DEVICECO

TECHNICAL FIELD

This invention relates to interchangeable input/output blocks for computing devices.

BACKGROUND

A computing device is typically designed with a limited number of I/O (input/output) ports. The increasing availability of the types of input and/or output devices that can be interfaced with a computer requires more space on a computer to provide a full-range of input/output connectors for every possible I/O device, and combination of I/O devices. Such input and/or output devices include printers, scanners, external data storage drives, a mouse or other pointing devices, audio and/or video players, joysticks, keyboards, and the like. Furthermore, limited system resources have to be allocated and shared to support a computer configured to accommodate the increasing number of I/O devices.

Limited space for I/O device connectors is particularly a problem with portable computing devices such as a laptop computer or a PDA (personal digital assistant) where the physical size of the computing device limits the available space to integrate input/output connectors for the many possible I/O devices. Additionally, providing input/output connectors for every possible I/O device, and the associated computer system resources, is a substantial expense and impractical.

The following description discusses systems and methods to provide input/output connectors and system resources for the ever increasing number of I/O devices when constrained to a limited space, such as with a portable computing device.

SUMMARY

An input/output module for a computing device interfaces external devices with components in the computing device. The input/output module has one, or multiple, input/output connectors to connect the external devices to the computing device.

The input/output module is removable from the computer and interchangeable with a different input/output module having a different input/output connector than the first input/output module. The computing device has the components to interface with external devices connected to either of the input/output modules when either input/output module is installed in the computing device.

The input/output module passes unmodified signals between the external devices and the computer components. Alternatively, an input/output module can have a component to process a signal in which case the input/output module passes unmodified signals, and/or processes signals and passes modified signals, between the external devices and the computer components.

An input/output module has an input/output connector configuration identifier to inform a computing device of the input/output connector configuration of the input/output module. The configuration identifier can be stored on a memory storage device in the input/output module, or the configuration identifier can be decoded from the pin configuration in the input/output module.

BRIEF DESCRIPTION OF THE DRAWINGS

The same numbers are used throughout the drawings to reference like features and components.

DETAILED DESCRIPTION

A computing device can be configured to perform various functions when connected with external devices such as printing devices, scanning devices, external data storage drives, a mouse or other pointing devices, an audio and/or video player, joysticks, keyboards, and the like. The following discussion describes systems and methods to configure a computing device with interchangeable input/output modules each having a different combination of input/output connectors. The input/output module connectors connect the external devices to the computing device.

In the described embodiments, the computing device is illustrated and described as a portable computer. However, the interchangeable input/output modules, and other related aspects of the described embodiments, are applicable to other types of devices such as servers, desktop computers, and the many different types of mobile computing devices of varying sizes and designations. Such mobile computing devices include laptop computers, handheld computers, notebook computers, sub-notebook computers, palm-top computers, palm-sized computers, pocket computers, personal digital assistants, personal organizers, and the like. Although the context of this disclosure describes a portable computer, the pertinent aspects are applicable to computing devices in general.

Figure 1:
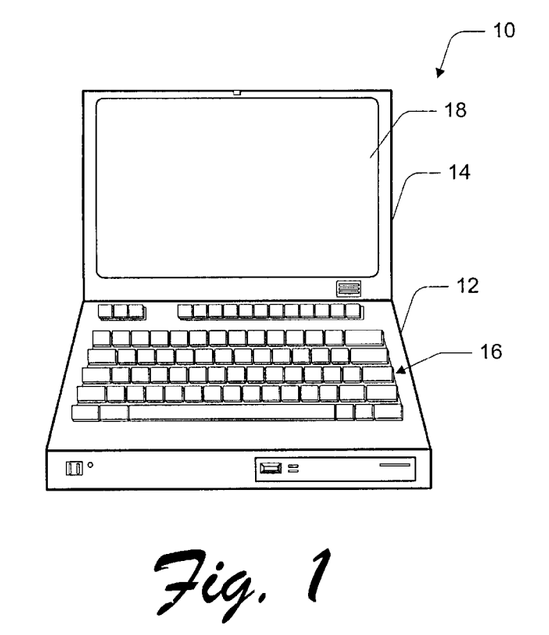
FIG. 1 illustrates a front view of a portable computing device.

FIG. 1 shows a computing device 10, embodied in the form of a portable computer having a housing base 12 and a housing lid 14. The housing base 12 and the housing lid 14 are connected together via a hinge or other flexible joint (not shown) to permit the housing lid 14 to fold down atop the housing base 12. A keyboard assembly 16 is mounted within the housing base 12 and a flat panel display 18 is mounted within the housing lid 14.

Figure 2:
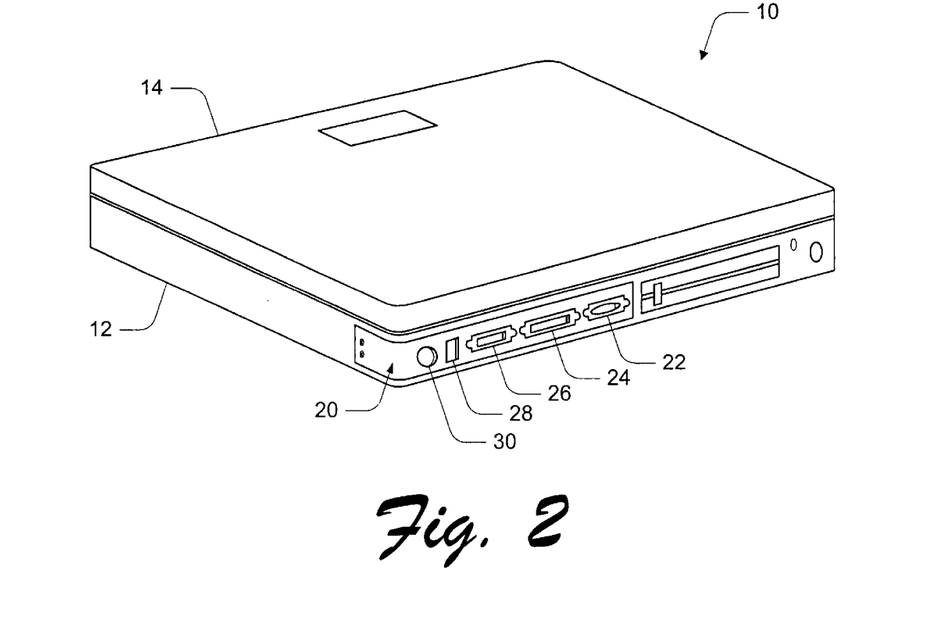
FIG. 2 illustrates a back view of the portable computing device shown in FIG. 1.

FIG. 2 shows the back of portable computer 10 with the housing lid 14 closed onto the housing base 12. An interchangeable input/output module 20 is installed into the computer housing base 12 and is electrically connected with the portable computer 10. The input/output module 20 has input/output connectors 22 through 30 designed to connect external devices (not shown) to the portable computer 10. The combination of connectors 22 through 30 are typically identified as a legacy input/output block of connectors where "legacy" identifies a commonplace technology or traditional standard. Any suitable number and/or types of connectors can be provided on input/output module 20. Specific non-limiting examples are given below.

A CRT/DVI connector 22 connects a computer CRT monitor, flat panel monitor, projection monitor, and the like to the portable computer 10. A parallel connector 24 is typically used to connect such peripherals as printing devices and external data storage drives. A serial connector 26 is typically used to connect such peripherals as a mouse pointing device or a modem. A USB (universal serial bus) connector 28 is an interface between the portable computer 10 and external devices such as audio players, joysticks, keyboards, telephones, scanners, and printers. A PS/2 (personal system) connector 30 can also connect a mouse or pointing device to the portable computer 10.

Figure 3:
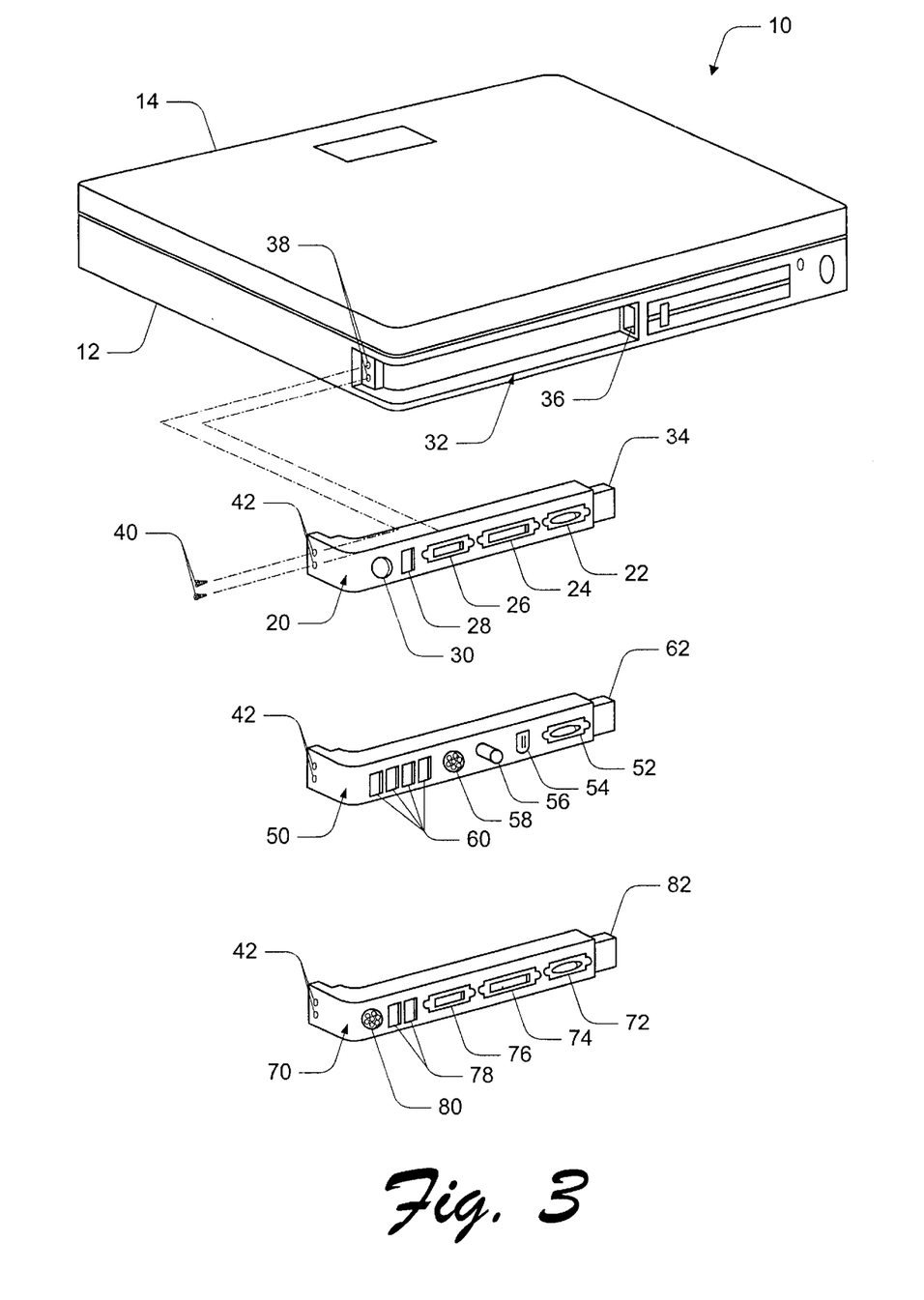
FIG. 3 illustrates the portable computing device shown in FIG. 2 and interchangeable input/output modules.

FIG. 3 shows the back of portable computer 10 and the interchangeable input/output module 20 removed from the computer housing base 12. The housing base 12 has an input/output module inset 32 (or channel, cutout, recessed section, receptacle configuration, etc.) that an interchangeable input/output module is inserted into when installed in the portable computer 10.

The input/output module 20 has a module connector 34 to electrically connect the input/output connectors 22 through 30 with portable computer 10 when the input/output module is installed in the computer. The input/output module inset 32 in the computer housing base 12 has a connector receptacle 36 to plug in module connector 34 when installing an input/output module into the input/output module inset 32.

The input/output module inset 32 has fastener receptacles 38 to interlock fasteners 40 and secure an input/output module in the input/output module inset 32. The input/output module 20 has fastener openings 42 that align with the fastener receptacles 38 when the input/output module 20 is installed in the inset 32. As illustrated, the fasteners 40 are installed through the input/output module fastener openings 42 and into the fastener receptacles 38 to secure the input/output module into the inset 32.

Any combination of inset configurations and fasteners to secure an interchangeable input/output module in a computing device can be used. Fasteners include screws, snaps, nuts and bolts, interlocking components, and the like. The illustrated configuration facilitates sliding an input/output module into the inset 32 such that the module connector 34 slides into the connector receptacle 36. The input/output module is then secured in place so that the module connector 34 will not inadvertently disengage from the connector receptacle 36.

FIG. 3 also illustrates two other interchangeable input/output modules 50 and 70. Both input/output modules 50, 70 have fastener openings 42 that align with the fastener receptacles 38 in the input/output module inset 32 when the input/output modules 50, 70 are installed in the inset 32 in the computer housing base 12. Each input/output module 50, 70 also has a module connector 62 and 82 respectively, that plugs into the connector receptacle 36 in the computer housing base 12.

Input/output module 50 has connectors 52 through 60 designed to connect external devices (not shown) to the portable computer 10. The combination of connectors 52 through 60 are referred to as a legacy-free input/output block of connectors where "legacy-free" identifies a new and emerging or recently developed technology standard. The terms "legacy" and "legacy-free" do not define absolutes with regards to traditional input/output connectors and emerging technology input/output connectors, as evidenced by the commonality of a CRT/DVI connector 22 and 52 on modules 20 and 50, respectively.

The input/output module 50 also has an IEEE 1394 connector 54 that is a serial bus interface to support high-performance data rates for mass storage devices and digital video equipment such as digital video recorders, DVD, camcorders, and high-speed/high-resolution printers and scanners. A TV-out connector 56 outputs a television signal to an external device. An S-Video out connector 58 outputs a video signal to an external device. A plurality of USB connectors 60 are also shown as input/output connectors on input/output module 50.

The input/output module 70 has connectors 72 through 80 that are a combination, or mixed-mode, of legacy and legacy-free connectors, each of which are described above in connection with the description of input/output modules 20 and 50. Input/output module 70 has a CRT/DVI connector 72, a parallel connector 74, a serial connector 76, multiple USB connectors 78, and an S-Video out connector 80. As illustrated, any combination and number of input/output connectors can be incorporated into an input/output module.

Figure 4:
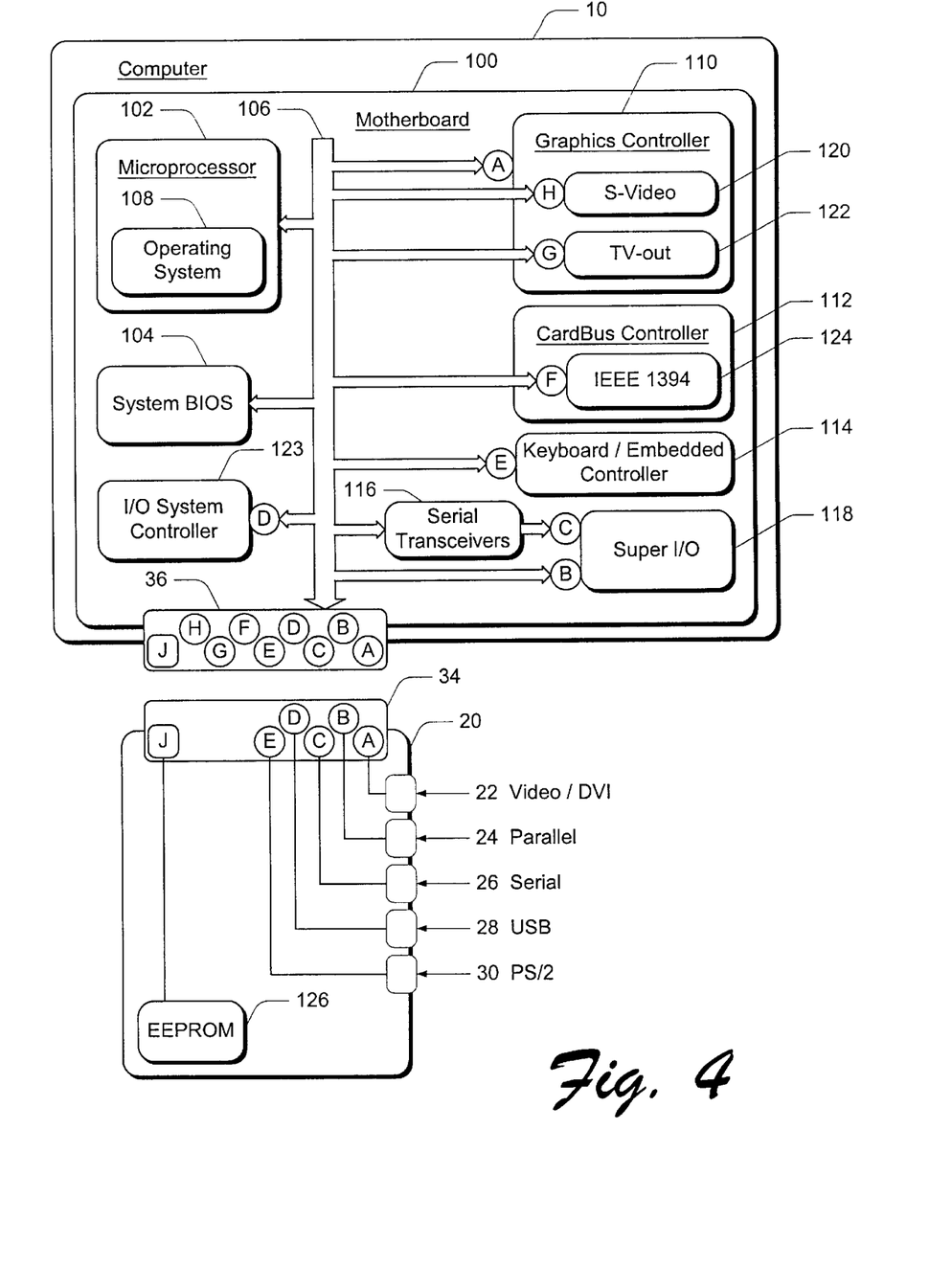
FIG. 4 is a block diagram that illustrates components of a computing device and an interchangeable input/output module.

FIG. 4 shows components of portable computer 10 and interchangeable input/output module 20 in a block diagram. Computer 10 has a motherboard 100 that supports the computer's basic circuitry and components. The motherboard 100 has a microprocessor 102, a system BIOS 104, and bus circuitry 106 that is an electronic interface between the microprocessor 102, the system BIOS 104, and the other components within the computer 10. An operating system 108 executes on the microprocessor 102.

The motherboard 100 also supports components that send and/or receive inputs and outputs from external devices. The components include a graphics controller 110, a cardbus controller 112, a keyboard/embedded controller 114, serial transceivers 116, and a super I/O component 118. The graphics controller 110 supports an S-video out component 120 and a TV-out component 122. Alternatively, the S-video out and TV-out components can be integrated with the graphics controller 110 to form a single component. The motherboard 100 also supports an I/O system controller 123 that can be implemented with an Intel PIIX4 or an Intel ICH3, for example.

The super I/O component 118 can be implemented with a National PC87388 or a SMSC FDC37C869, for example. The cardbus controller 112, such as a TI1420 or a TI1450 for example, supports an IEEE 1394 controller 124. A TI1420 cardbus controller supports an IEEE 1394 standard with an external IEEE 1394 controller and an external IEEE 1394 IC (integrated component) such as a TI TSB41Abx Phy (physical layer) IC. A TI1450 has an IEEE 1394 controller integrated within it to support an the IEEE 1394 standard.

FIG. 4 also illustrates the common input/output module connector receptacle 36. The module connector receptacle 36 has pass-thru connections A through H that interface with associated connections in the module connector 34 on the input/output module 20. Module connector 34 has associated connections A through E for the five input/output connectors on the input/output module 20.

The connection designations A through H and J are illustrated for the reader's benefit and are intended to clarify the routing of inputs from external devices to components within the computer. Furthermore, it is to be understood that the connection designations and signal routing illustrations are diagrammatic and not intended to accurately reflect the actual number of cables, wiring, bus connections, component connections and features, and the like.

The CRT/DVI connector 22 interfaces an external video device (not shown) and passes through a video output from the graphics controller 110 via the bus circuitry 106, connector receptacle 36, connection A, and module connector 34, associated connection A. Similarly, an input at parallel connector 24 is input to the super I/O 118 (connection B), an input at serial connector 26 is input to the serial transceivers 116 and on to the super I/O 118 (connection C), an input at USB connector 28 is input to the I/O system controller 123 (connection D), and an input at the PS/2 connector 30 is input to the keyboard/embedded controller 114 (connection E) in the computer 10. The input/output module 20 passes each signal from the input/output connectors 22 through 30 to the module connector 34 unmodified. That is to say that a signal from an external device is simply passed through the input/output module 20 without being processed or otherwise altered by a component in the input/output module.

Input/output module 20 can include a memory component such as EEPROM 126 (electrically erasable programmable read-only memory) to store an encoded description of the configuration of the input/output connectors 22 through 30 on the input/output module 20. The EEPROM 126 communicates the configuration of the input/output connectors to the computer 10 via connection J in the module connector 34 and associated connection J in the connector receptacle 36.

With the configuration information, the computer 10 reserves system resources that would otherwise be allocated for one of the computer components 110–124 if a particular input/output connector were present on the input/output module 20. This enhances proper resource allocation for only those external devices that may be present or provide an input to the computer 10. For instance, the computer 10 does not allocate system resources to support the IEEE 1394 controller 124 because input/output module 20 does not have an IEEE 1394 input/output connector. Similarly, the computer 10 de-allocates previously allocated resources from the computer components upon determining, or being informed, that a newly installed interchangeable input/output module does not have a particular input/output connector that was present on a previously installed interchangeable input/output module.

Most external input/output devices require PC system resource assignments. These include I/O address ranges in memory to exchange data via the memory range, system interrupts to gain attention of the CPU to allow data transfer, and DMA (direct memory access) channels to allow for the fastest data transfer. For example, a serial port requires an I/O address range in memory plus a system interrupt. A parallel port requires two I/O address ranges plus a DMA channel. A mouse (internal or external) requires a system interrupt. A floppy disk drive requires two I/O address ranges, a system interrupt, plus a DMA channel.

A computer model establishes a limited set of resources that are demanded by a large set of I/O devices. Sharing is often required and functionality, or system functional reliability, is sometimes compromised. This means that a user will often have to take action with the assignments to get some functions to work.

To allow a system to have the versatility it needs to support many different I/O types, resources have to be planned in advance for all of the possible resource needs. If the I/O is configurable, as with the interchangeable input/output modules described above, the BIOS or operating system can be informed that some of the external input/output devices are not, or will not, be present and thereby reserve resources by not assigning and/or sharing resources for any particular device that will not be present.

An alternative to having the EEPROM 126 to store an encoded description of the I/O configuration for input/output module 20 is to encode a series of pins in the module connector 34 that describe the I/O configuration for the input/output module. The pin configuration can be decoded at the computer 10 and converted to a description of the I/O configuration for any one particular interchangeable input/output module.

Figure 5:
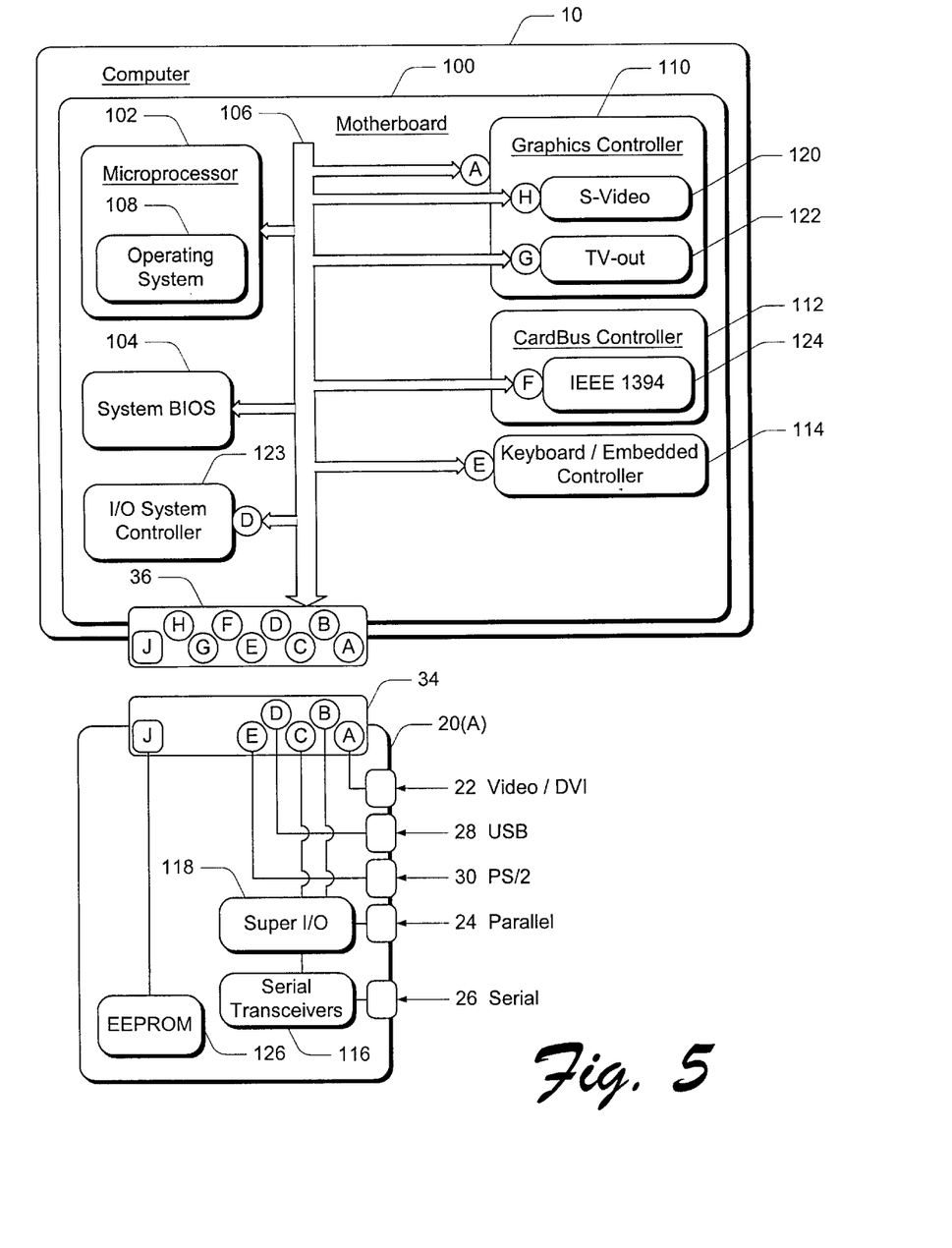
FIG. 5 is a block diagram that illustrates components of a computing device and an interchangeable input/output module.

FIG. 5 shows components for an alternative embodiment of portable computer 10 and input/output module 20 shown in the block diagram in FIG. 4. The serial transceivers 116 and the super I/O component 118 are removed from the computer motherboard 100 and relocated to an input/output module 20(A). In this configuration, an input at parallel connector 24 is input to the super I/O 118 in the input/output module 20(A). Similarly, an input at serial connector 26 is input to the serial transceivers 116 and on to the super I/O 118 in the input/output module 20(A). The serial and parallel inputs are processed at the input/output module 20(A) before being passed on to the computer 10.

Figure 6:
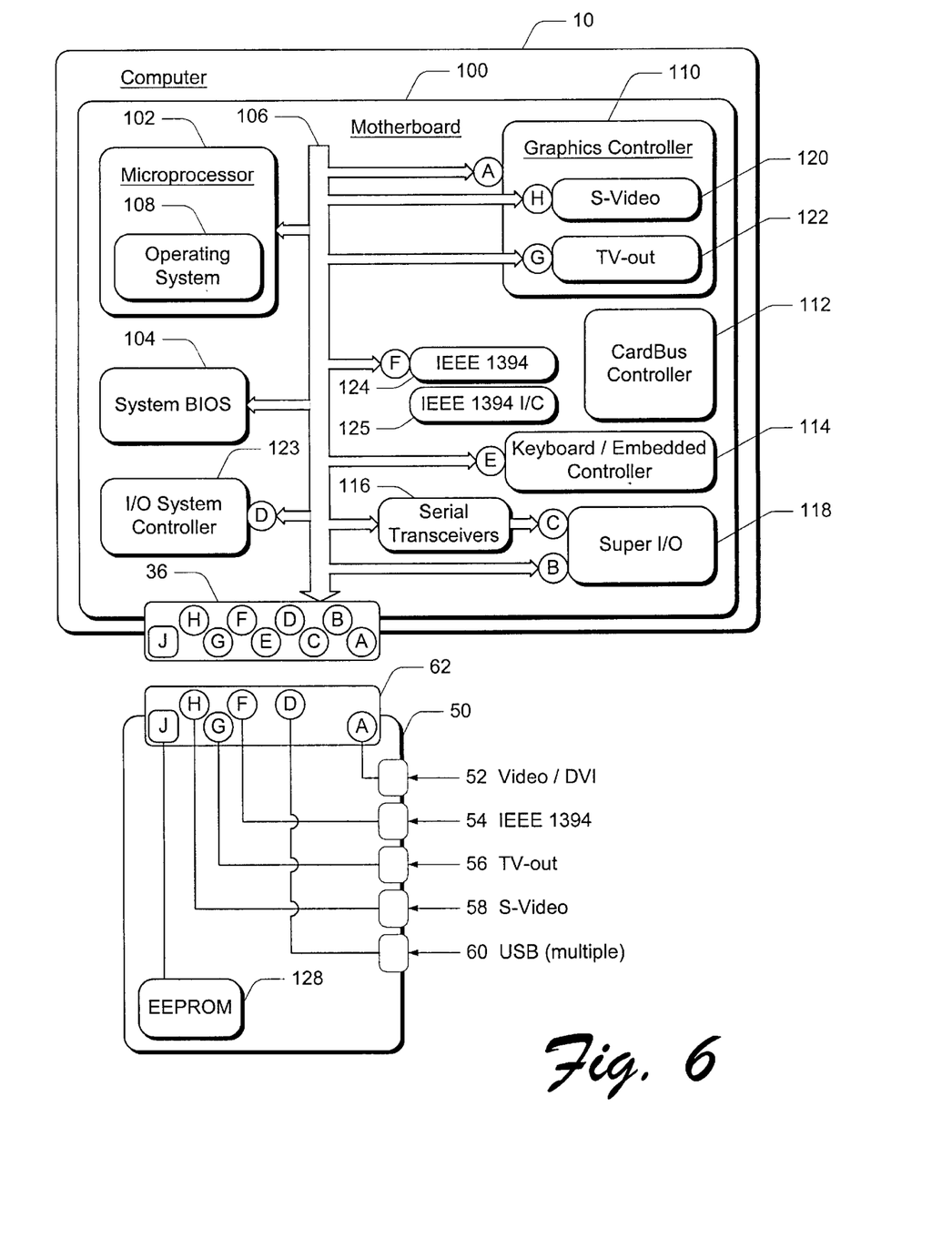
FIG. 6 is a block diagram that illustrates components of a computing device and an interchangeable input/output module.

FIG. 6 shows components of portable computer 10 (described above with reference to FIG. 4) and interchangeable input/output module 50 in a block diagram. Computer 10 has an alternate implementation of the IEEE 1394 controller 124 from that shown in FIG. 4.

The IEEE 1394 controller 124 is implemented as a separate device from the cardbus controller 112. In this configuration, the cardbus controller 112 can be implemented with a TI1420 and the IEEE 1394 controller 124 with a TI TSB12LV26 IEEE 1394 controller, for example. An additional component, IEEE 1394 IC (integrated component) 125, is implemented with the IEEE 1394 controller 124 when the controller 124 is implemented as a separate device from the cardbus controller 112. The IEEE 1394 IC 125 can be implemented with a TI TSB41Abx Phy (physical layer) IC.

The input/output module 50 has a module connector 62. The module connector 62 has associated connections A, D, and F through H for the five input/output connectors 52 through 60 on the input/output module 50.

The CRT/DVI connector 52 interfaces an external video device (not shown) and passes through a video output from the graphics controller 110 via the bus circuitry 106, connector receptacle 36, connection A, and module connector 62, associated connection A. Similarly, an input at the IEEE 1394 connector 54 is input to the IEEE 1394 controller 124 (connection F), a TV signal generated at the TV-out component 122 is output to an external video device via the TV-out connector 56 (connection G), an S-video signal generated at the S-video out component 120 is output to an external video device via the S-Video out connector 58 (connection H), and an input at one of the USB connectors 60 is input to the I/O system controller 123 (connection D).

The input/output module 50 passes each signal from the input/output connectors 52 through 60 to the module connector 62, or vice-versa, unmodified. That is to say that an input or output signal is simply passed though the input/output module 50 without being processed or otherwise altered by a component in the input/output module.

The input/output module 50 has an EEPROM 128 to store an encoded description of the configuration of the input/output connectors 52 through 60 on the input/output module 50. The EEPROM 128 communicates the configuration of the input/output connectors to the computer 10 via connection J in the module connector 62 and associated connection J in the connector receptacle 36. The computer 10 reserves system resources that would otherwise be allocated for one of the computer components 110–124 if a particular input/output connector were present on the input/output module 50. For example, the computer 10 does not allocate system resources to support that portion of the Super I/O 118 that supports serial and parallel signal inputs because input/output module 50 does not have either a serial or a parallel input/output connector.

Figure 7:
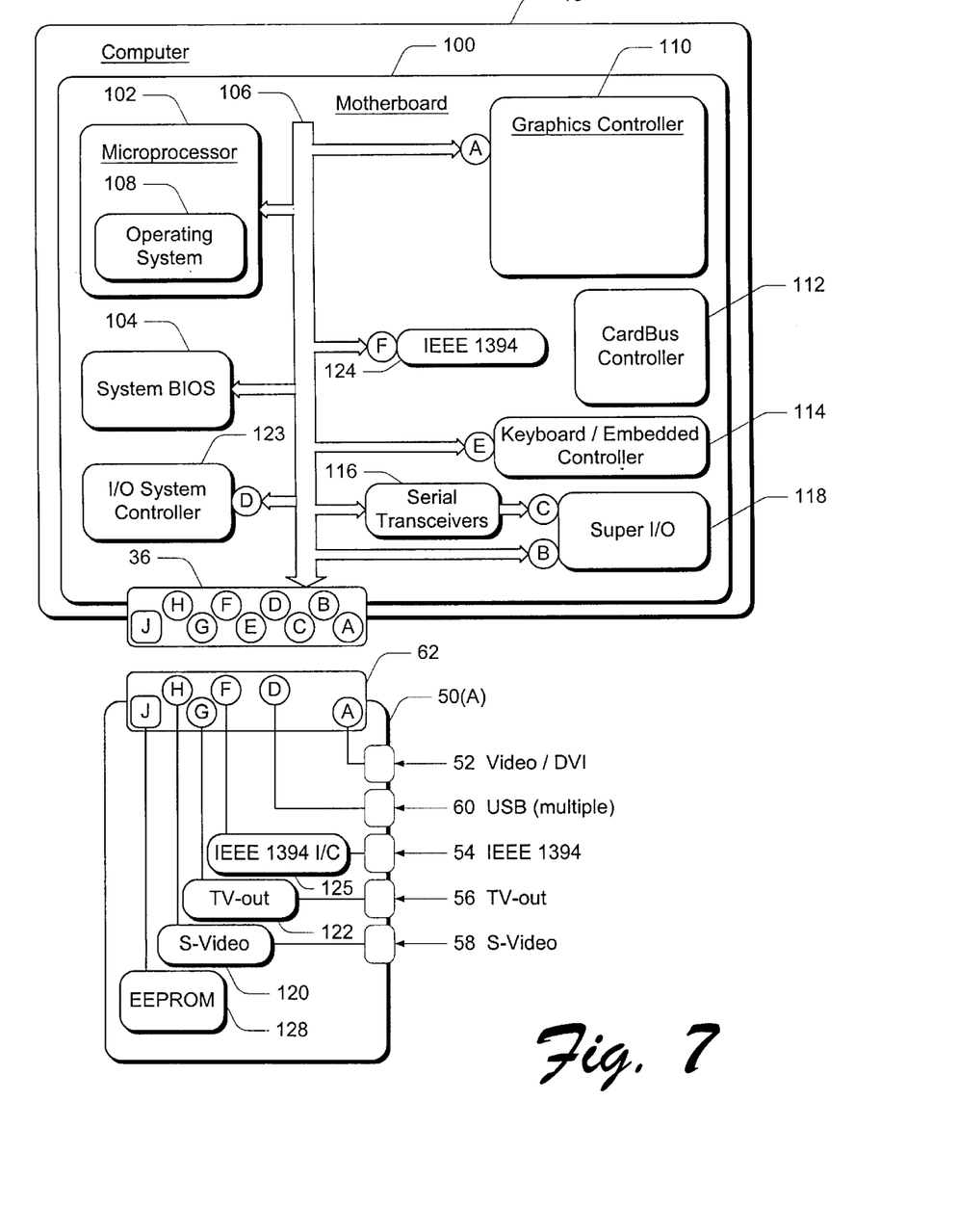
FIG. 7 is a block diagram that illustrates components of a computing device and an interchangeable input/output module.

FIG. 7 shows components for an alternative embodiment of portable computer 10 and input/output module 50 shown in the block diagram in FIG. 6. The S-Video out component 120, the TV-out component 122, and the IEEE 1394 IC 125 are removed from the computer motherboard 100 and relocated to an input/output module 50(A). In this configuration, an input at the IEEE 1394 connector 54 is input to the IEEE 1394 IC 125 in the input/output module 50(A) before the input is passed on to the computer 10.

Figure 8:
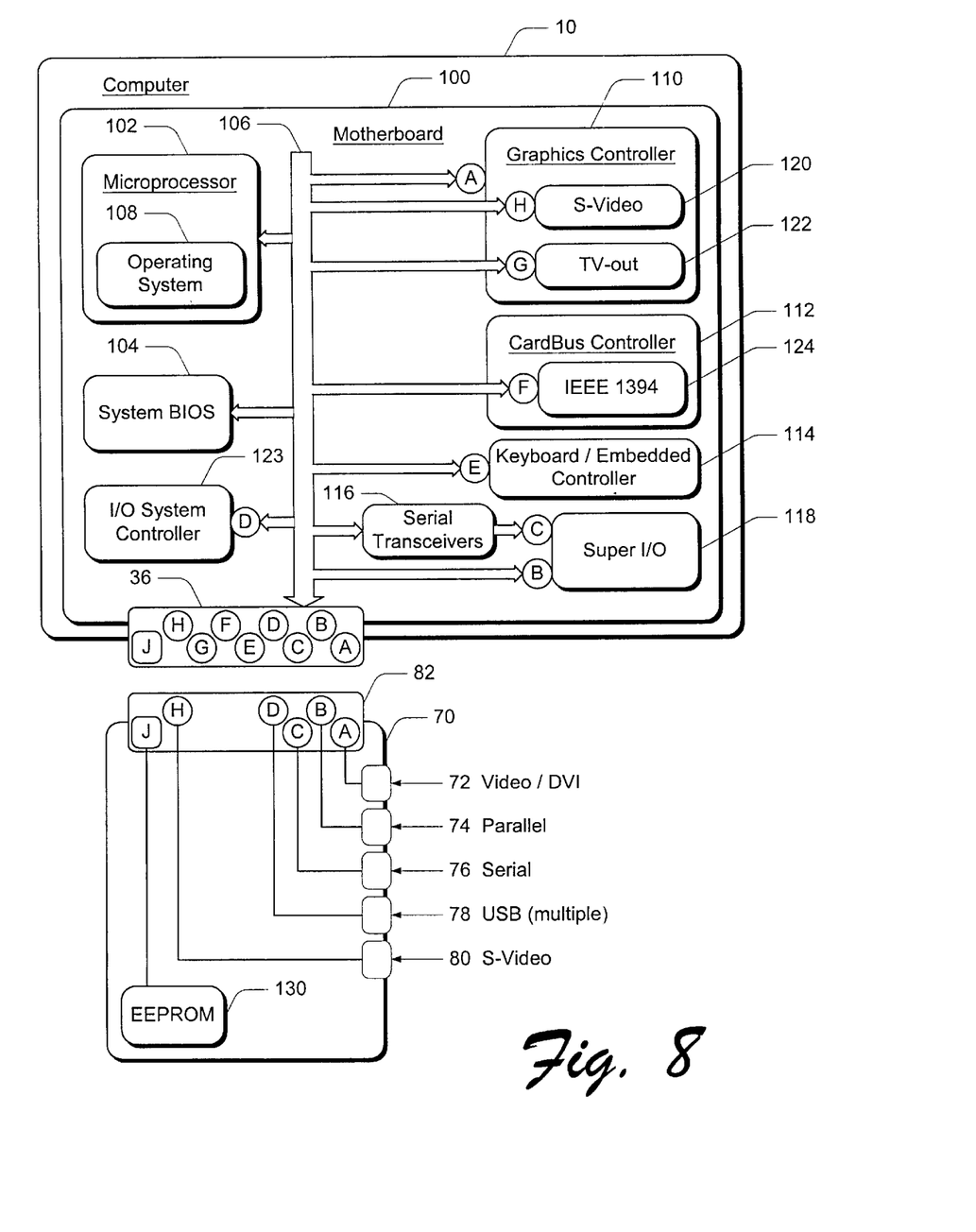
FIG. 8 is a block diagram that illustrates components of a computing device and an interchangeable input/output module.

FIG. 8 shows components of portable computer 10 (described above with reference to FIG. 4) and interchangeable input/output module 70 in a block diagram. The input/output module 70 has a module connector 82. The module connector 82 has associated connections A through D and H for the five input/output connectors 72 through 80 on the input/output module 70.

The CRT/DVI connector 72 interfaces an external video device (not shown) and passes through a video output from the graphics controller 110 via the bus circuitry 106, connector receptacle 36, connection A, and module connector 82, associated connection A. Similarly, an input at parallel connector 74 is input to the super I/O 118 (connection B), an input at serial connector 76 is input to the serial transceivers 116 and on to the super I/O 118 (connection C), an input at one of the multiple USB connectors 78 is input to the I/O system controller 123 (connection D), and an S-video signal generated at the S-video out component 120 is output to an external video device via the S-Video out connector 80 (connection H).

The input/output module 70 has an EEPROM 130 to store an encoded description of the configuration of the input/output connectors 72 through 80 on the input/output module 70. The EEPROM 130 communicates the configuration of the input/output connectors to the computer 10 via connection J in the module connector 82 and associated connection J in the connector receptacle 36.

The computer 10 reserves system resources that would otherwise be allocated for one of the computer components 110–124 if a particular input/output connector were present on the input/output module 70. For example, the computer 10 does not allocate system resources to support the IEEE 1394 controller 124 because input/output module 70 does not have an IEEE 1394 input/output connector.

Figure 9:
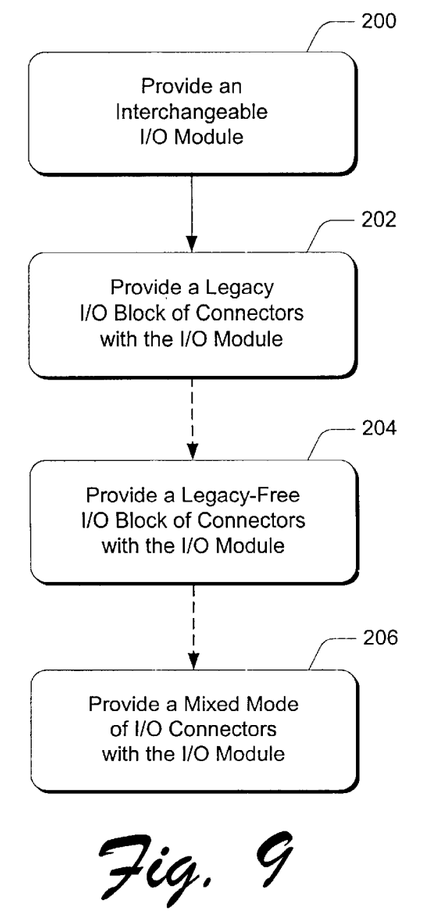
FIG. 9 is a flow diagram that describes a method to configure a computing device with interchangeable input/output modules having different input/output connectors.

FIG. 9 illustrates a method to provide interchangeable input/output modules with differing input/output connectors. At block 200, an interchangeable input/output module is provided. The input/output module can be attached to, integrated with, or installed into a computing device having multiple components that are interfaced with external devices. Input/output connectors are provided to interface an external device with an associated computing device component.

At block 202, a legacy input/output block of connectors, as described above, is provided. Alternatively, a legacy-free input/output block of connectors, as described above, is provided at block 204. Alternatively, a mixed mode of input/output connectors can be provided at block 206. The input/output connectors are supported by the input/output module(s).

Figure 10:
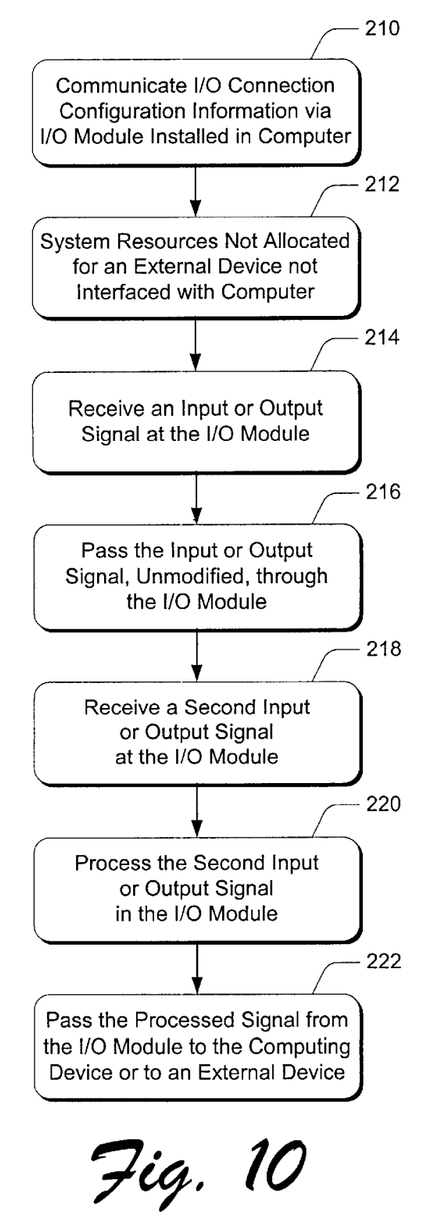
FIG. 10 is a flow diagram that describes a method to receive signals at an interchangeable input/output module having different input/output connectors, and pass unmodified signals and/or processed signals to a computing device.

FIG. 10 illustrates a method to utilize an interchangeable input/output module having different input/output connectors. At block 210, the input/output connector configuration is communicated to a computing device having the interchangeable input/output module installed, or integrated, with the computing device.

At block 212, system resources are reserved that would otherwise be allocated to interface an external device with the computing device via the interchangeable input/output module if the interchangeable input/output module does not have an input/output connector for the particular external device. That is, system resources are not allocated for an external device that is not, or will not be, connected to the computing device.

At block 214 an input or output signal is received at the interchangeable input/output module from either an external device or from a component within the computing device. The interchangeable input/output module has an input/output connector to receive the input signal from an external device. At block 216, the input or output signal is passed through the input/output module in an unmodified form. That is to say, the input signal is not processed or modified as it is passed from the input/output connector to the module connector on the interchangeable input/output module, or vice-versa.

At block 218, a second input or output signal is received at the input/output module from either an external device at a second input/output connector on the interchangeable input/output module, or from a component within the computing device. The second input or output signal is processed with a signal processing component in the interchangeable input/output module to form a processed signal at block 220. At block 222, the processed input is passed from the signal processing component to the module connector. The module connector interfaces the signal processing component with the computing device and/or an external device.

The systems and methods described herein can allow a single computing platform to support different input/output requirements. The interchangeable modules can be user replaceable and/or factory and tech-support configurable to accommodate and support users with different input/output and computing needs.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

We claim:
1. A system, comprising:
   a computing device having one or more components each configured to perform a function in response to an input from an associated external device, the computing device having a second component configured to perform a second function that is different from the first-mentioned function in response to an input from a second external device;
   a first input/output module configured for removable association with the computing device and having one or more input/output connectors configured to interface one or more associated external devices with the one or more components in the computing device, the first input/output module further configured to pass one or more unmodified signals between the one or more components and the one or more associated external devices; and a second input/output module configured to be interchangeable with the first input/output module and having at least one input/output connector configured to interface the second external device with the second component, the first and second input/output modules having at least one different connector, wherein the second input/output module is configured to pass one or more unmodified signals between the second external device and the second component.

2. A system, comprising:

a computing device having one or more components each configured to perform a function in response to an input from an associated external device, the computing device having a second component configured to perform a second function in response to an input from a second external device;

a first input/output module configured for removable association with the computing device and having one or more input/output connectors configured to interface one or more associated external devices with the one or more components in the computing device, the first input/output module further configured to pass one or more unmodified signals between the one or more components and the one or more associated external devices; and a second input/output module configured to be interchangeable with the first input/output module and having at least first and second input/output connectors to interface both external devices with the computing device, the second input/output module further configured to pass one or more unmodified signals between the one or more components and the one or more associated external devices.

3. A system as recited in claim 1, wherein:

the input/output module has multiple input/output connectors each configured to interface an external device with the computing device, wherein the first input/output module is configured to pass at least one input from an external device unmodified to a component in the computing device; and the first input/output module has a signal processing component to process an input from an external device, wherein the first input/output module is configured to pass at least one processed input from the first input/output module to the computing device.

4. A system as recited in claim 1, wherein the first input/output module comprises one or more of:
a CRT/DVI (digital video input) input/output connector;
a parallel input/output connector;
a serial input/output connector;
a USB (universal serial bus) input/output connector; and
a PS/2 (personal system) input/output connector.

5. A system as recited in claim 1, wherein the first input/output module comprises one or more of:
a CRT/DVI (digital video input) input/output connector;
an IEEE 1394 input/output connector;
a TV-out connector;
an S-Video out connector; and
at least one USB (universal serial bus) input/output connector.

6. A system as recited in claim 1, wherein:
the first input/output module comprises one or more of:
a CRT/DVI (digital video input) input/output connector;
a parallel input/output connector;
a serial input/output connector;
a USB (universal serial bus) input/output connector;
a PS/2 (personal system) input/output connector;
the second input/output module comprises one or more of:
a CRT/DVI (digital video input) input/output connector;
an IEEE 1394 input/output connector;
a TV-out connector;
an S-Video out connector; and
at least one USB (universal serial bus) input/output connector.

7. A system as recited in claim 1, wherein the computing device does not allocate system resources for the one or more components that can not be interfaced with an external device via the first input/output module.

8. A system as recited in claim 1, wherein the computing device is configured to reserve system resources that would otherwise be allocated to interface the one or more components with an associated external device via the first input/output module if the first input/output module does not have an input/output connector for the external device.

9. A system as recited in claim 1, wherein the first input/output module is configured to inform the computing device of an input/output connector configuration on the first input/output module.

10. A system as recited in claim 9, wherein the first input/output module comprises a memory storage device to store the input/output connector configuration and wherein the first input/output module is configured to inform the computing device of the input/output connector configuration using the input/output connector configuration stored in the memory storage device.

11. A system as recited in claim 9, wherein the first input/output module comprises a module connector having a pin configuration that can be decoded by the computing device to determine the input/output connector configuration on the first input/output module.

12. A system as recited in claim 9, wherein the computing device de-allocates system resources from the one or more components that can not be interfaced with an external device via the first input/output module.

13. At least one interchangeable input/output module for a computer, comprising one or more input/output connectors supported by a module housing, each of which are configured to interface an external device with a component in the computer, at least one of the input/output connectors being configured to pass unmodified signals between its associated external device and its associated component, wherein the one or more input/output connectors comprise one or more of:
a CRT/DVI (digital video input) input/output connector;
an IEEE 1394 input/output connector;
a TV-out connector;
an S-Video out connector; and
at least one USB (universal serial bus) input/output connector.

14. At least one interchangeable input/output module as recited in claim 13, wherein the module housing is configured to be removably attached to the computer.

15. At least one interchangeable input/output module as recited in claim 13, further comprising:
multiple input/output connectors each configured to interface an external device with a component in the computer; and
a signal processing component to process an input from an external device, wherein the input/output module is configured to pass at least one unmodified input from an external device to an associated component in the computer, and wherein the input/output module is configured to pass at least one processed input from an external device to an associated component in the computer.

16. At least one interchangeable input/output module as recited in claim 13, wherein the one or more input/output connectors comprise one or more of:
a CRT/DVI (digital video input) input/output connector;
a parallel input/output connector;
a serial input/output connector;
a USB (universal serial bus) input/output connector;
a PS/2 (personal system) input/output connector.

17. At least one interchangeable input/output module as recited in claim 13, further comprising an input/output connector configuration identifier that can inform the computer of an input/output connector configuration of the input/output module.

18. At least one interchangeable input/output module as recited in claim 17, wherein the input/output connector configuration identifier comprises a memory storage device that is configured to store the input/output connector configuration and communicate the input/output connector configuration to the computer.

19. At least one interchangeable input/output module as recited in claim 17, wherein the input/output connector configuration identifier is decoded from a pin configuration in the input/output module.

20. A method, comprising:
providing an input/output module configured for removable attachment to a computer that contains multiple components that can interface with different external devices; and
providing multiple different input/output connectors supported by the input/output module, at least some of the input/output connectors being configured to establish a connection between an external device and an associated component in the computer and pass signals in an unmodified form between the external device and its associated component, wherein the input/output connectors comprise one or more of the following:
a CRT/DVI (digital video input) input/output connector;
an IEEE 1394 input/output connector;
a TV-out connector;
an S-Video out connector; and
at least one USB (universal serial bus) input/output connector.

21. A method as recited in claim 20, further comprising establishing a connection between the input/output module and the computer that contains at least one component that can be interfaced through the input/output module to its associated external device.

22. A method as recited in claim 20, wherein the input/output connectors comprise one or more of the following:
a CRT/DVI (digital video input) input/output connector;
a parallel input/output connector;
a serial input/output connector;
a USB (universal serial bus) input/output connector;
a PS/2 (personal system) input/output connector.

23. A method as recited in claim 20, wherein the input/output connectors comprise one or more of the following:
a CRT/DVI (digital video input) input/output connector;
an IEEE 1394 input/output connector;
a TV-out connector;
an S-Video out connector;
at least one USB (universal serial bus) input/output connector.

24. A system as recited in claim 2, wherein:
the first input/output module has multiple input/output connectors each configured to interface an external device with the computing device, the first input/output device further configured to pass at least one input from an external device unmodified to a component in the computing device; and
the first input/output module has a signal processing component to process an input from an external device, the first input/output module further configured to pass at least one processed input from the input/output module to the computing device.

25. A system as recited in claim 2, wherein the first input/output module comprises one or more of:
a CRT/DVI (digital video input) input/output connector;
a parallel input/output connector;
a serial input/output connector;
a USB (universal serial bus) input/output connector; and
a PS/2 (personal system) input/output connector.

26. A system as recited in claim 2, wherein the first input/output module comprises one or more of:
a CRT/DVI (digital video input) input/output connector;
an IEEE 1394 input/output connector;
a TV-out connector;
an S-Video out connector; and
at least one USB (universal serial bus) input/output connector.

27. A system as recited in claim 2, wherein:
the first input/output module comprises one or more of:
a CRT/DVI (digital video input) input/output connector;
a parallel input/output connector;
a serial input/output connector;
a USB (universal serial bus) input/output connector;
a PS/2 personal system) input/output connector;
the second input/output module comprises one or more of:
a CRT/DVI (digital video input) input/output connector;
an IEEE 1394 input/output connector;
a TV-out connector;
an S-Video out connector; and
at least one USB (universal serial bus) input/output connector.

28. A system as recited in claim 2, wherein the computing device does not allocate system resources for the one or more components that can not be interfaced with an external device via the first input/output module.

29. A system as recited in claim 2, wherein the computing device is configured to reserve system resources that would otherwise be allocated to interface the one or more components with an associated external device via the first input/output module if the first input/output module does not have an input/output connector for the external device.

30. A system as recited in claim 2, wherein the first input/output module is configured to inform the computing device of an input/output connector configuration on the first input/output module.

31. A system as recited in claim 30, wherein the first input/output module comprises a memory storage device to store the input/output connector configuration and wherein the first input/output module is configured to inform the computing device of the input/output connector configuration using the input/output connector configuration stored in the memory storage device.

32. A system as recited in claim 30, wherein the first input/output module comprises a module connector having a pin configuration that can be decoded by the computing device to determine the input/output connector configuration on the first input/output module.

33. A system as recited in claim 30, wherein the computing device de-allocates system resources from the one or more components that can not be interfaced with an external device via the first input/output module.

34. A system, comprising:
   a computing device having one or more components each configured to perform a function in response to an input from an associated external device;
   an input/output module configured for removable association with the computing device and having one or more input/output connectors configured to interface one or more associated external devices with the one or more components in the computing device, the input/output module further configured to pass one or more unmodified signals between the one or more components and the one or more associated external devices;
   the input/output module comprising one or more of:
      a CRT/DVI (digital video input) input/output connector;
      an IEEE 1394 input/output connector;
      a TV-out connector;
      an S-Video out connector; and
      at least one USB (universal serial bus) input/output connector.

35. A system as recited in claim 34, further comprising a second input/output module configured to be interchangeable with the input/output module, the second input/output module comprising one or more of:
   a CRT/DVI (digital video input) input/output connector;
   a parallel input/output connector;
   a serial input/output connector;
   a USB (universal serial bus) input/output connector; and
   a PS/2 (personal system) input/output connector.

36. A system as recited in claim 34, wherein the computing device does not allocate system resources for the one or more components that can not be interfaced with an external device via the input/output module.

37. A system as recited in claim 34, wherein the computing device is configured to reserve system resources that would otherwise be allocated to interface the one or more components with an associated external device via the input/output module if the input/output module does not have an input/output connector for the external device.

38. A system as recited in claim 34, wherein the input/output module is configured to inform the computing device of an input/output connector configuration on the input/output module.

39. A system as recited in claim 38, wherein the input/output module comprises a memory storage device to store the input/output connector configuration and wherein the input/output module is configured to inform the computing device of the input/output connector configuration using the input/output connector configuration stored in the memory storage device.

40. A system as recited in claim 38, wherein the input/output module comprises a module connector having a pin configuration that can be decoded by the computing device to determine the input/output connector configuration on the input/output module.

41. A system as recited in claim 38, wherein the computing device de-allocates system resources from the one or more components that can not be interfaced with an external device via the input/output module.

42. A system, comprising:
   a computing device having one or more components each configured to perform a function in response to an input from an associated external device;
   an input/output module configured for removable association with the computing device and having one or more input/output connectors configured to interface one or more associated external devices with the one or more components in the computing device, the input/output module further configured to pass one or more unmodified signals between the one or more components and the one or more associated external devices; and
   wherein the input/output module comprises a module connector having a pin configuration that can be decoded by the computing device to determine the input/output connector configuration on the input/output module such that the input/output module informs the computing device of the input/output connector configuration.

43. A system as recited in claim 42, wherein the computing device has a second component configured to perform a second function that is different from the first-mentioned function in response to an input from a second external device, the system further comprising:
   a second input/output module configured to be interchangeable with the input/output module and having at least one input/output connector configured to interface the second external device with the second component, the input/output modules having at least one different connector, the second input/output module further configured to pass one or more unmodified signals between the second external device and the second component.

44. A system as recited in claim 42, wherein the computing device has a second component configured to perform a second function in response to an input from a second external device, the system further comprising:
   a second input/output module configured to be interchangeable with the input/output module and having at least first and second input/output connectors to interface both external devices with the computing device, the second input/output module further configured to pass one or more unmodified signals between the one or more components and the one or more associated external devices.

45. A system as recited in claim 42, wherein:
   the input/output module has multiple input/output connectors each configured to interface an external device with the computing device, wherein the input/output module is configured to pass at least one input from an external device unmodified to a component in the computing device; and
   the input/output module has a signal processing component to process an input from an external device, wherein the input/output module is configured to pass at least one processed input from the input/output module to the computing device.

46. A system as recited in claim 42, wherein the input/output module comprises one or more of:
a CRT/DVI (digital video input) input/output connector;
a parallel input/output connector;
a serial input/output connector;
a USB (universal serial bus) input/output connector; and
a PS/2 (personal system) input/output connector.

47. A system as recited in claim 42, wherein the input/output module comprises one or more of:
a CRT/DVI (digital video input) input/output connector;
an IEEE 1394 input/output connector;
a TV-out connector;
an S-Video out connector; and
at least one USB (universal serial bus) input/output connector.

48. A system as recited in claim 42, wherein:
the input/output module comprises one or more of:
a CRT/DVI (digital video input) input/output connector;
a parallel input/output connector;
a serial input/output connector;
a USB (universal serial bus) input/output connector;
a PS/2 (personal system) input/output connector;
the system further comprises a second input/output module configured to be interchangeable with the input/output module, the second input/output module comprising one or more of:
a CRT/DVI (digital video input) input/output connector;
an IEEE 1394 input/output connector;
a TV-out connector;
an S-Video out connector; and
at least one USB (universal serial bus) input/output connector.

49. A system as recited in claim 42, wherein the computing device does not allocate system resources for the one or more components that can not be interfaced with an external device via the input/output module.

50. A system as recited in claim 42, wherein the computing device is configured to reserve system resources that would otherwise be allocated to interface the one or more components with an associated external device via the input/output module if the input/output module does not have an input/output connector for the external device.

51. A system as recited in claim 50, wherein the input/output module comprises a memory storage device to store the input/output connector configuration and wherein the input/output module is configured to inform the computing device of the input/output connector configuration using the input/output connector configuration stored in the memory storage device.

52. A system as recited in claim 50, wherein the computing device de-allocates system resources from the one or more components that can not be interfaced with an external device via the input/output module.

53. At least one interchangeable input/output module for a computer, comprising:
one or more input/output connectors supported by a module housing, each of which are configured to interface an external device with a component in the computer, at least one of the input/output connectors being configured to pass unmodified signals between its associated external device and its associated component; and
an input/output connector configuration identifier that can inform the computer of an input/output connector configuration of the input/output module, wherein the input/output connector configuration identifier is decoded from a pin configuration in the input/output module.

54. At least one interchangeable input/output module as recited in claim 53, wherein the module housing is configured to be removably attached to the computer.

55. At least one interchangeable input/output module as recited in claim 53, further comprising:
multiple input/output connectors each configured to interface an external device with a component in the computer; and
a signal processing component to process an input from an external device, wherein the interchangeable input/output module is configured to pass at least one unmodified input from an external device to an associated component in the computer, and wherein the interchangeable input/output module is configured to pass at least one processed input from an external device to an associated component in the computer.

56. At least one interchangeable input/output module as recited in claim 53, wherein the one or more input/output connectors comprise one or more of:
a CRT/DVI (digital video input) input/output connector;
a parallel input/output connector;
a serial input/output connector;
a USB (universal serial bus) input/output connector; and
a PS/2 (personal system) input/output connector.

57. At least one interchangeable input/output module as recited in claim 53, wherein the one or more input/output connectors comprise one or more of:
a CRT/DVI (digital video input) input/output connector;
an IEEE 1394 input/output connector;
a TV-out connector;
an S-Video out connector; and
at least one USB (universal serial bus) input/output connector.

58. At least one interchangeable input/output module as recited in claim 53, wherein the input/output connector configuration identifier comprises a memory storage device that is configured to store the input/output connector configuration and communicate the input/output connector configuration to the computer.

* * * * *